United States Patent
Yu et al.

(10) Patent No.: US 10,444,903 B2
(45) Date of Patent: Oct. 15, 2019

(54) TOUCH DETECTION METHOD

(71) Applicant: SILICON INTEGRATED SYSTEMS CORP., Hsinchu (TW)

(72) Inventors: Hsin-Hsuan Yu, Hsinchu (TW); Chin-Hua Kuo, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 0 days.

(21) Appl. No.: 15/693,309

(22) Filed: Aug. 31, 2017

(65) Prior Publication Data

US 2018/0121021 A1 May 3, 2018

(30) Foreign Application Priority Data

Oct. 28, 2016 (TW) .............................. 105135183 A

(51) Int. Cl.
G06F 3/045 (2006.01)
G06F 3/041 (2006.01)
G06F 3/044 (2006.01)

(52) U.S. Cl.
CPC ............ G06F 3/0418 (2013.01); G06F 3/044 (2013.01)

(58) Field of Classification Search
None
See application file for complete search history.

(56) References Cited

U.S. PATENT DOCUMENTS

2011/0025638 A1*  2/2011  Salaverry ................ G06F 3/044
                                                         345/174

* cited by examiner

*Primary Examiner* — Carl Adams
(74) *Attorney, Agent, or Firm* — Maschoff Brennan

(57) ABSTRACT

A touch detection method is applied to a touch panel including sensing units and includes: detecting sensing values corresponding to the sensing units; selecting a first sensing value that is a local maximum among the sensing values; determining a first sensing unit corresponding to the first sensing value among the sensing units; selecting from the sensing units a second sensing unit located at the first side of the first sensing unit; selecting from the sensing values a second sensing value corresponding to the second sensing unit; and generating a touch coordinate according to the first sensing value, the second sensing value, a touch sensing value distribution model, and the coordinate of the first sensing unit.

9 Claims, 4 Drawing Sheets

TOUCH DETECTION METHOD

CROSS-REFERENCE TO RELATED APPLICATIONS

This non-provisional application claims priority under 35 U.S.C. § 119(a) on Patent Application No(s). 105135183 filed in Taiwan, R.O.C. on Oct. 28, 2016, the entire contents of which are hereby incorporated by reference.

TECHNICAL FIELD

The disclosure relates to a touch detection method, more particularly to a calculation method of coordinates of touch points.

BACKGROUND

Touch devices, such as touch panels, touch screens and so on, have been greatly used in daily life. Mainstream touch devices nowadays mainly include capacitive or projective capacitive touch devices. Typically, methods of generating coordinates of touch points used in capacitive/projective capacitive touch devices include: (1) setting the coordinate of a sensing unit corresponding to the maximum sensing value as a touch point; (2) determining a touched region by a binarization method to calculate the barycentric coordinate of the touched region; and (3) using sensing values and the coordinates of sensing units to assign weights and calculate a barycentric coordinate. However, the method (1) obtains discrete reported coordinates, and the resolution is defined by the size of sensing units; the method (2) leads to a relatively-large computation load and a relatively-slow response speed, and the calculated barycentric coordinate may not correspond to the sensing unit corresponding to the maximum sensing value; and the method (3) leads to a larger computation load and a slower response speed than the method (2).

SUMMARY

According to one or more embodiments of the present disclosure, a touch detection method is applied to a touch panel including sensing units, and includes: detecting sensing values corresponding to the sensing units; select a first sensing value that is a local maximum among the sensing values; determining, among the sensing units, a first sensing unit corresponding to the first sensing value; selecting, from the sensing units, a second sensing unit located at a first side of the first sensing unit; acquiring, from the sensing values, a second sensing value corresponding to the second sensing unit; and generating a touch coordinate according to the first sensing value, the second sensing value, a distribution model of touch sensing values and a coordinate of the first sensing unit.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
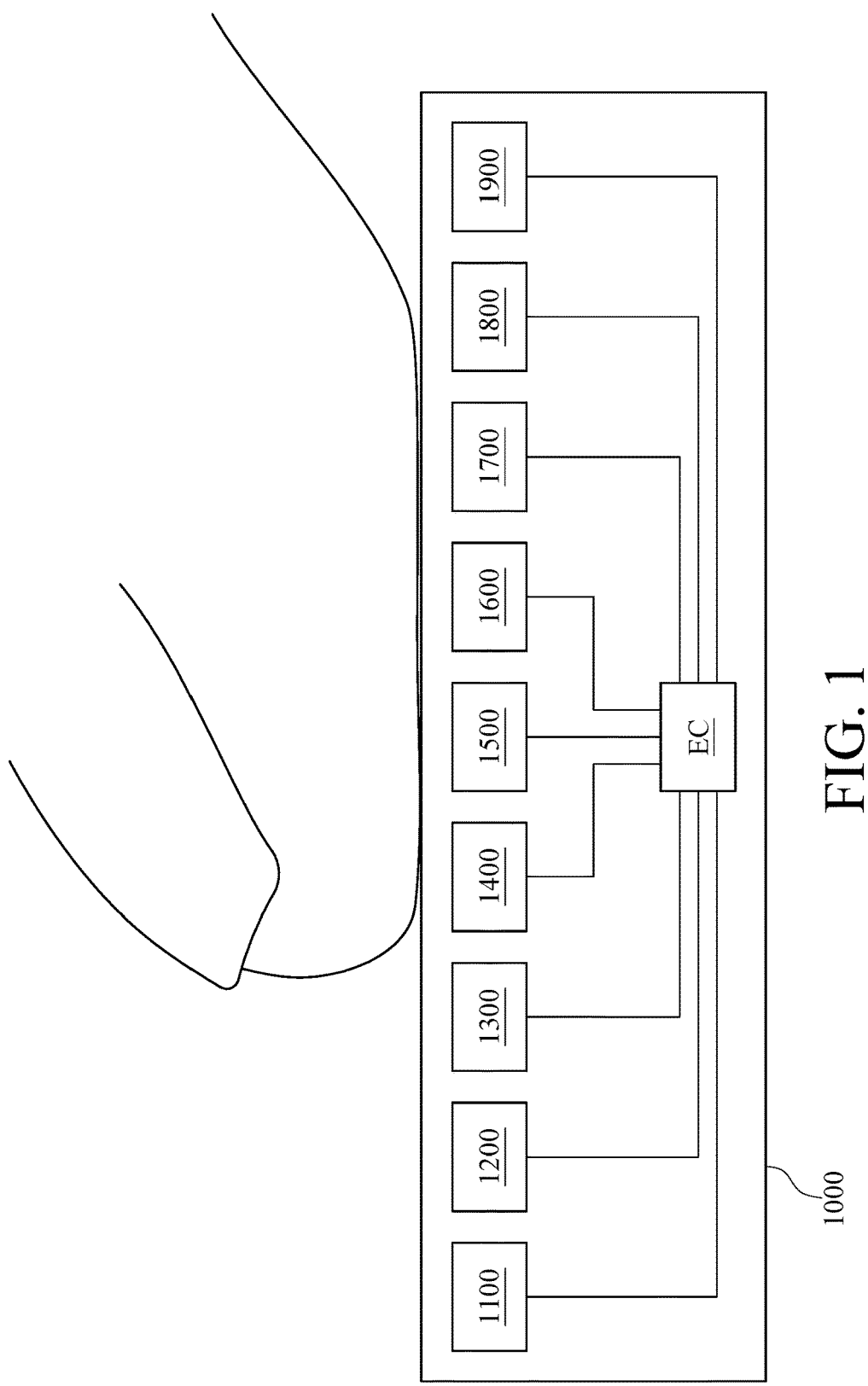
FIG. 1 illustrates an example that a finger touches a touch panel.
Figure 2:
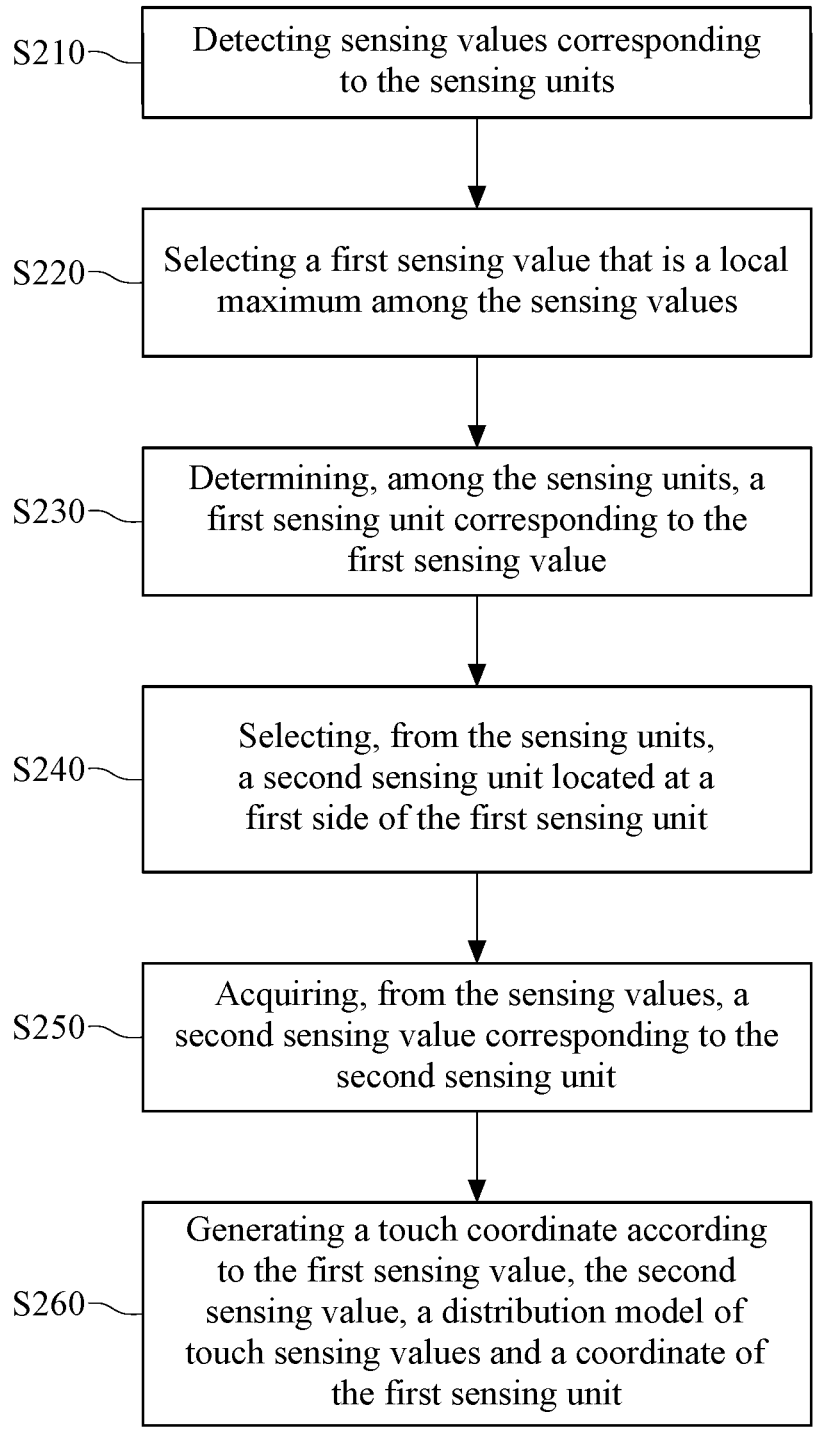
FIG. 2 is a flow chart of a touch detection method according to an embodiment of the present disclosure.

Please refer to FIG. 1 and FIG. 2. FIG. 1 illustrates an example that a finger touches a touch panel, and FIG. 2 is a flow chart of a touch detection method according to an embodiment of the present disclosure. As shown in FIG. 1, a touch panel 1000 usually includes sensing units and embedded controllers EC. Here, a row or column of sensing units, e.g. sensing units 1100 to 1900 is shown for an exemplary illustration, and however, one of ordinary skill in the art can appreciate that the touch panel 1000 can include more than 9 sensing units. As shown in FIG. 2, a touch detection method according to an embodiment of the present disclosure includes steps below.

In step S210, it is performed to detect sensing values corresponding to the sensing units. Specifically, in the case of the embodiment shown in FIG. 1, the sensing values of all the sensing units 1100 to 1900 are detected. In an embodiment, if the touch panel 1000 is a capacitive (self-inductance) touch panel, each sensing unit is a capacitor made of, e.g. an upper electrode and a lower electrode that overlap each other. In this case, this upper electrode (an electrode close to the surface) is a scan sensing electrode, and this lower electrode (an electrode far from the surface) is a common electrode. When the panel surface region corresponding to a sensing unit is not touched, a capacitor between the upper electrode of the sensing unit and the ground end of the system opposite to the upper electrode of the sensing unit is formed by the upper electrode and the lower electrode. When the panel surface region corresponding to a sensing unit is touched, capacitors between the upper electrode of the sensing unit and the ground end of the system opposite to the upper electrode of the sensing unit is formed by the upper electrode and the lower electrode and by the upper electrode and the user's finger. Therefore, when the region corresponding to a sensing unit is not touched, one pulse generated by the embedded controller EC leads to relatively-large variances in the voltage on the upper electrode. Otherwise, when the region corresponding to a sensing unit is touched, one pulse generated by the embedded controller EC leads to relatively-small variances in the voltage on the upper electrode.

In another embodiment, if the touch panel 1000 is a projective capacitive (mutual capacitance) touch panel, each sensing unit is formed by, e.g. a first electrode and a second electrode adjacent to the first electrode. In this case, the first electrode is, e.g. a scan electrode, and the second electrode is, e.g. a sensing electrode. When the region corresponding to a sensing unit is not touched, a pulse on the scan electrode is applied to the sensing electrode through the capacitor between the two electrodes. When the region corresponding to a sensing unit is touched, a part of a pulse on the scan electrode is applied in part to the user's finger and the other part is applied to the sensing electrode. Therefore, one pulse generated by the embedded controller EC has a smaller proportion transmitted to the sensing electrode when the region corresponding to a sensing unit is touched, as compared to when the region corresponding to a sensing unit is not touched.

The aforementioned two cases present that there is a difference in voltage potential measured on the sensing electrode (scan sensing electrode) between a condition that the region corresponding to a sensing unit is touched and another condition that the region is not touched, and such a difference is considered a sensing value. Specifically, a sensing value changes with the distance between a touch object (typically, a finger) and the touch panel surface.

Figure 3:
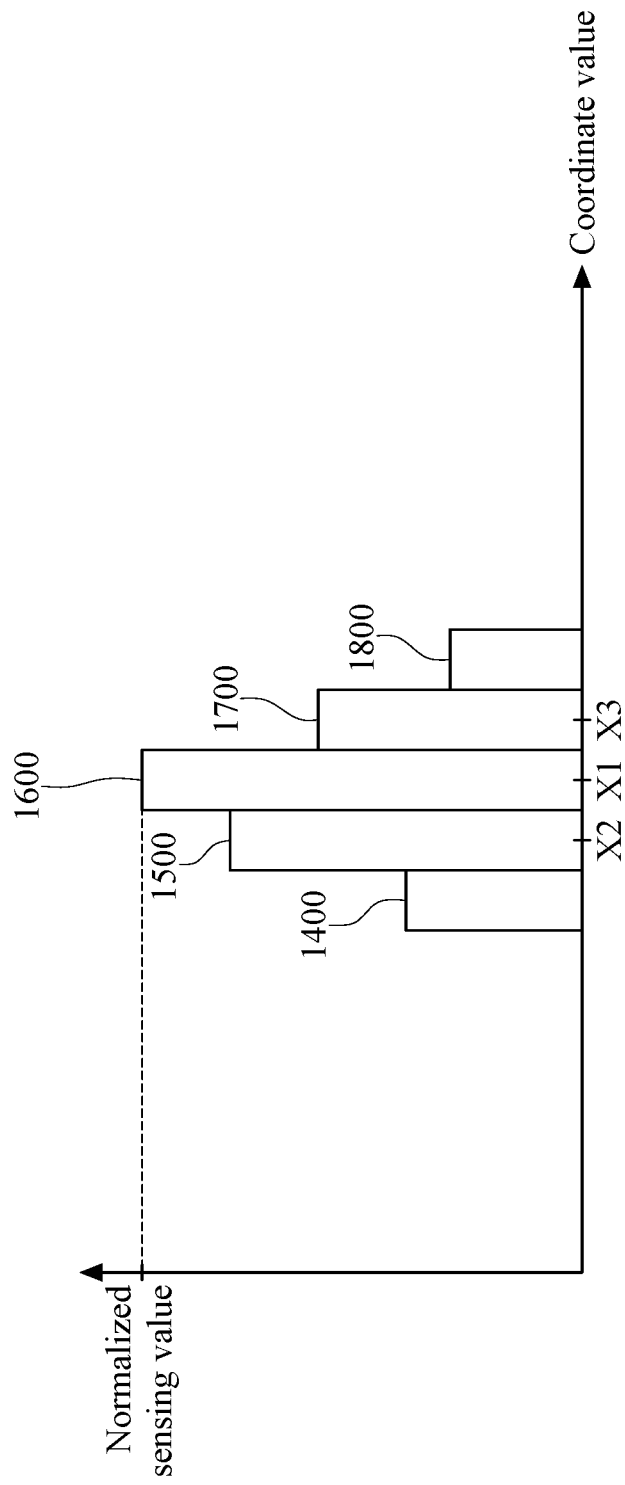
FIG. 3 illustrates the normalized sensing value of each sensing unit according to an embodiment of the present disclosure.

In step S220, it is performed to select a first sensing value that is a local maximum among the sensing values. In step S230, it is performed to determine a first sensing unit corresponding to the first sensing value among the sensing units. In the two steps, the sensing unit corresponding to a local maximum sensing value is usually a sensing unit that is touched, so the first sensing value, which is the local maximum among the sensing values, and the corresponding first sensing unit have a higher priority to be used for the first stage orientation. That is, a basis coordinate to determine a touch point is the coordinate of the first sensing unit. In an embodiment, the central coordinate of the first sensing unit is set as the basis coordinate of the touch point. Here, please further refer to FIG. 1 and FIG. 3. FIG. 3 illustrates the normalized sensing value of each sensing unit according to an embodiment of the present disclosure. In the histogram shown in FIG. 3, the X axis expresses from left to right sensing values respectively corresponding to the sensing units 1100 to 1900 that are a part of all the sensing units, and the Y axis expresses normalized sensing values (from 0 to 1). As shown in FIG. 3, the sensing value corresponding to the sensing unit 1600 is a local maximum, so its normalized sensing value is 1. The normalized sensing value corresponding to the sensing unit 1500 is 0.8, the normalized sensing value corresponding to the sensing unit 1700 is 0.6, and the normalized sensing value corresponding to the sensing unit 1400 is 0.4.

In step S240, it is performed to select, from the sensing units, a second sensing unit located at a first side of the first sensing unit. In step S250, it is performed to acquire, from the sensing values, a second sensing value corresponding to the second sensing unit. In the case based on FIG. 1 and FIG. 3, step S240 is performed to select the sensing unit 1500 at the left side of the sensing unit 1600 and acquire the normalized sensing value of 0.8 corresponding to the sensing unit 1500. Therefore, the first sensing value is the normalized sensing value of 1 corresponding to the sensing unit 1600, and the second sensing value is the normalized sensing value of 0.8 corresponding to the sensing unit 1500.

Figure 4:
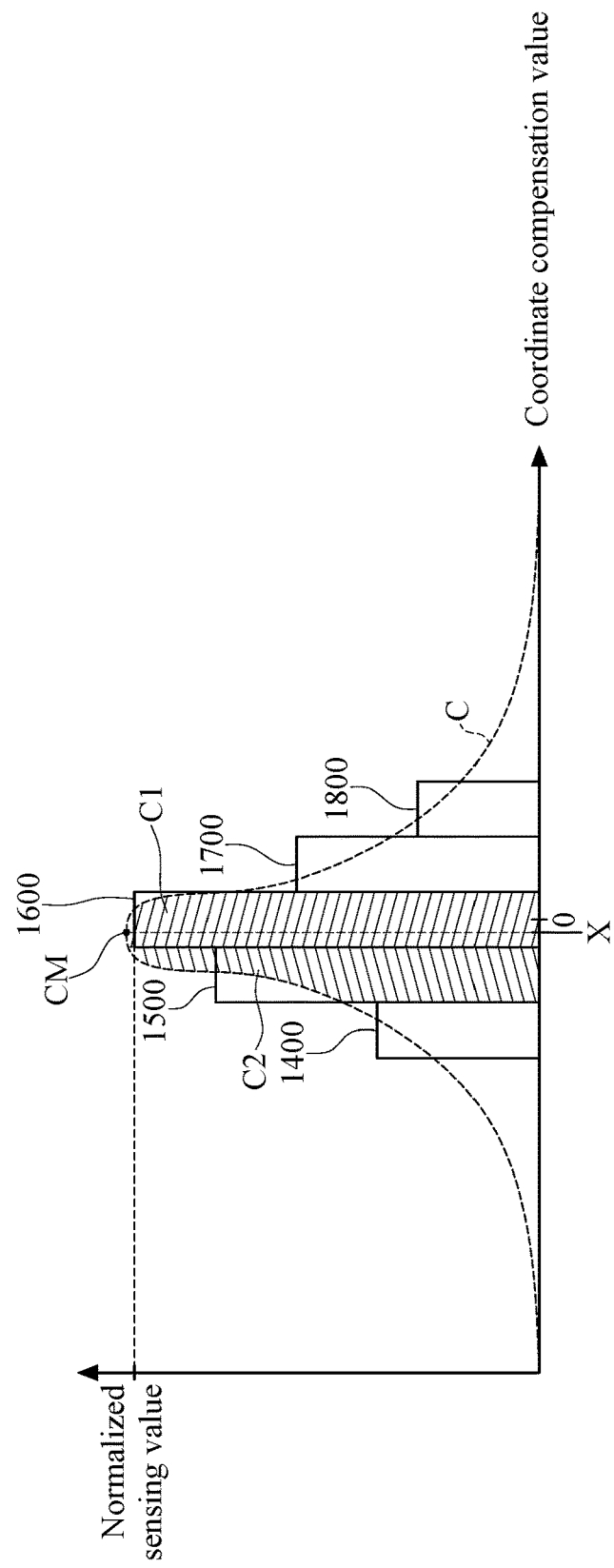
FIG. 4 illustrates a distribution model of touch sensing values is overlapped by the normalized sensing values in FIG. 3 according to an embodiment of the present disclosure.

In step S260, it is performed to generate a touch coordinate according to the first sensing value, the second sensing value, a distribution model of touch sensing values and the coordinate of the first sensing unit. In this embodiment, please refer to FIG. 4 which illustrates a distribution model of touch sensing values is overlapped by the normalized sensing values in FIG. 3 according to an embodiment of the present disclosure. Specifically, the dotted line C in FIG. 4 is a modified normal distribution curve, and the solid line in FIG. 4 represents the histogram shown in FIG. 3. Also, the integral value of the area under the dotted line C shown in FIG. 4 is unlike the integral value of a typical normal distribution curve that is 1. In details, as shown in FIG. 4, a region corresponding to the first sensing value under the dotted line C in respect to the X axis is named region C1, and a region corresponding to the second sensing value under the dotted line C in respect to the X axis is named region C2. A ratio of the area of the region C2 to the area of the region C1 is 0.8 as the region C1 and the region C2 occupy the same length on the X axis. Furthermore, the central point on the X axis in the region C1 is set as the origin 0. In this way, the dotted line C has a point having the maximum value CM in respect to the Y axis and a coordinate compensation value X in respect to the X axis. As a result, the coordinate (basis coordinate) of the first sensing unit and the coordinate compensation value can be used to obtain a touch coordinate. In another embodiment, as shown in FIG. 3, in addition to the sensing unit 1500, the sensing unit 1600 and the corresponding normalized sensing values thereof, the sensing unit 1400 and its normalized sensing value of 0.4 are also used to perform the above calculation. Furthermore, in addition to the normal distribution model, a multinomial distribution model can also be used for the above calculation.

In general, a standard deviation should be known in the use of the normal distribution model. However, in an embodiment simplified with experiences, a sensing value corresponding to a sensing unit having an interval of two sensing units with the first sensing unit (the sensing unit 1600) can generally be ignored. That is, there are totally 5 sensing units including the first sensing unit (the sensing unit 1600) as a center, wherein the sensing units 1400 to 1800 are determined as corresponding to four standard deviations (having two positive standard deviations and two negative standard deviations and covering 95.45% of sensing values) in the normal distribution model, or are determined as corresponding to six standard deviations (having three positive standard deviations and three negative standard deviations and covering 99.73% of sensing values) in the normal distribution model.

In another embodiment, the sensing value corresponding to a sensing unit having an interval of one sensing unit with the first sensing unit (the sensing unit 1600) can usually be ignored. That is, there are totally three sensing units including the first sensing unit (the sensing unit 1600) as a center. In other words, the sensing units 1500 to 1700 are determined as corresponding to four standard deviations (having two positive standard deviations and two negative standard deviations and covering 95.45% of sensing values) in the normal distribution model, or are determined as corresponding to six standard deviations (having three positive standard deviations and three negative standard deviations and covering 99.73% of sensing values) in the normal distribution model. In this embodiment, the sensing value (second sensing value) corresponding to the sensing unit 1500 is further considered as an accumulated value of all sensing values on the left side of the normal distribution model.

In yet another embodiment, please refer to FIG. 3 again, in addition to the sensing unit 1500, the sensing unit 1600 and the corresponding normalized sensing values thereof, the sensing unit 1700 and its normalized sensing value of 0.6 are also used. In this embodiment, a polynomial function is used to calculate a touch coordinate. Specifically, the coordinate of the sensing unit 1500 is X1, and its normalized sensing value is 0.8; the coordinate of the sensing unit 1600 is X2, and its normalized sensing value is 1; and the coordinate of the sensing unit 1700 is X3, and its normalized sensing value is 0.6. These three sets of parameters are used to derive a quadratic function, $Y=A(X-C)2+B$, where the coefficient A is a negative value, and the coefficient C represents the touch coordinate. In other embodiments, the more the number of data of sensing units can be acquired, the more the number of degrees of a polynomial function can be used to confirm the touch coordinate; and one of ordinary skill in the art can easily understand how to achieve the embodiment using general mathematics after reading the aforementioned embodiment, and thus, the detail of the method to achieve the embodiment is not limited and is omitted hereafter.

In yet another embodiment, it can be done in advance to establish one or more lookup tables for the foregoing models and store the one or more lookup tables in a storage medium electrically connected to the embedded controller EC. For one or more embodiments in which the touch coordinate is generated based on a normal distribution model, if only first sensing value, the coordinate of the first sensing unit, the second sensing value and the coordinate of the second sensing unit are acquired, a first lookup table established in advance can be used. In this situation, a first ratio between the second sensing value and the first sensing value is directly used to look up a corresponding coordinate compensation value in the first lookup table, and then a touch coordinate can be obtained based on the coordinate of the first sensing unit. If the third sensing value and the coordinate of the third sensing unit are further acquired, a second lookup table established in advance can be used. In this situation, this second lookup table is a two-dimensional lookup table, so the first ratio between the second sensing value and the first sensing value and a second ratio between the third sensing value and the first sensing value are used as two-dimensional parameters for looking up a coordinate compensation value in the second lookup table and then a touch coordinate can be obtained based on the coordinate of the first sensing unit. Similarly, such a principle can be applied to a polynomial function model and a multinomial distribution model, and one of ordinary skill in the art can freely design a variety of lookup tables with common senses after reading the present disclosure; and the present disclosure does not intend to limit possible embodiments of a lookup table, and the related explanations are also omitted hereafter.

Accordingly, in the touch detection method in the foregoing embodiments of the present disclosure, sensing values of at least two sensing units are used together with a distribution model of touch sensing values to obtain a corresponding touch coordinate. In some embodiments, the present disclosure may achieve lower computation load than the conventional methods (2) and (3). In some other embodiments, the present disclosure may achieve higher accuracy than the conventional methods (1) and (2). Therefore, it is possible to provide a touch coordinate having high accuracy at a high response speed.

What is claimed is:

1. A touch detection method, applied to a touch panel comprising sensing units, and the touch detection method comprising:
   detecting sensing values corresponding to the sensing units;
   selecting a first sensing value that is a local maximum among the sensing values;
   determining, among the sensing units, a first sensing unit corresponding to the first sensing value;
   selecting, from the sensing units, a second sensing unit located at a first side of the first sensing unit;
   acquiring, from the sensing values, a second sensing value corresponding to the second sensing unit; and
   generating a touch coordinate according to the first sensing value, the second sensing value, a distribution model of touch sensing values and a coordinate of the first sensing unit,
   wherein the touch coordinate and the coordinate of the first sensing unit are on an identical axis;
   wherein the distribution model of touch sensing values is a normal distribution model, a multinomial distribution model or a polynomial function model, and generating the touch coordinate comprises:
      generating a histogram that comprises a first strip representing the first sensing value and a second strip representing the second sensing value;
      using the distribution model on the histogram to make a first area has a preset ratio to a second area, wherein the first area is an area under the distribution model with a base of the first strip, the second area is an area under the distribution model with a base of the second strip, the preset ratio is equal to a ratio of the first sensing value to the second sensing value;
      determining a coordinate of a peak of the distribution model as a coordinate compensation value; and
      determining the touch coordinate according to the coordinate of the first sensing unit and the coordinate compensation value.

2. The touch detection method according to claim 1, further comprising:
   selecting, from the sensing units, a third sensing unit located at a second side of the first sensing unit, which is opposite to the first side; and
   acquiring, from the sensing values, a third sensing value corresponding to the third sensing unit;
   wherein generating the touch coordinate is further based on the third sensing value and a coordinate of the third sensing unit.

3. The touch detection method according to claim 2, wherein a lookup table is established for the distribution model of touch sensing values, and generating the touch coordinate further comprises:
   obtaining the coordinate compensation value from the lookup table according to at least the first sensing value and the second sensing value.

4. The touch detection method according to claim 3, wherein the lookup table is established according to the normal distribution model, the multinomial distribution model or the polynomial function model.

5. The touch detection method according to claim 1, further comprising:
   selecting, from the sensing units, a fourth sensing unit adjacent to the second sensing unit, wherein the fourth sensing unit and the first sensing unit are respectively at two opposite sides of the second sensing unit; and
   acquiring, from the sensing values, a fourth sensing value corresponding to the fourth sensing unit;
   wherein generating the touch coordinate is further based on the fourth sensing value and the coordinate of the fourth sensing unit.

6. The touch detection method according to claim 5, wherein a lookup table is established for the distribution model of touch sensing values, and generating the touch coordinate further comprises:
   obtaining the coordinate compensation value from the lookup table according to at least the first sensing value and the second sensing value.

7. The touch detection method according to claim 6, wherein the lookup table is established according to the normal distribution model, the multinomial distribution model or the polynomial function model.

8. The touch detection method according to claim 1, wherein a lookup table is established for the distribution model of touch sensing values, and generating the touch coordinate further comprises:
   obtaining the coordinate compensation value from the lookup table according to at least the first sensing value and the second sensing value.

9. The touch detection method according to claim 8, wherein the lookup table is established according to the normal distribution model, the multinomial distribution model or the polynomial function model.

* * * * *